July 30, 1963  P. HADZERIGA  3,099,528
RECOVERY OF VALUES FROM NATURAL LAKE AND SEA BRINES
Filed Jan. 10, 1962
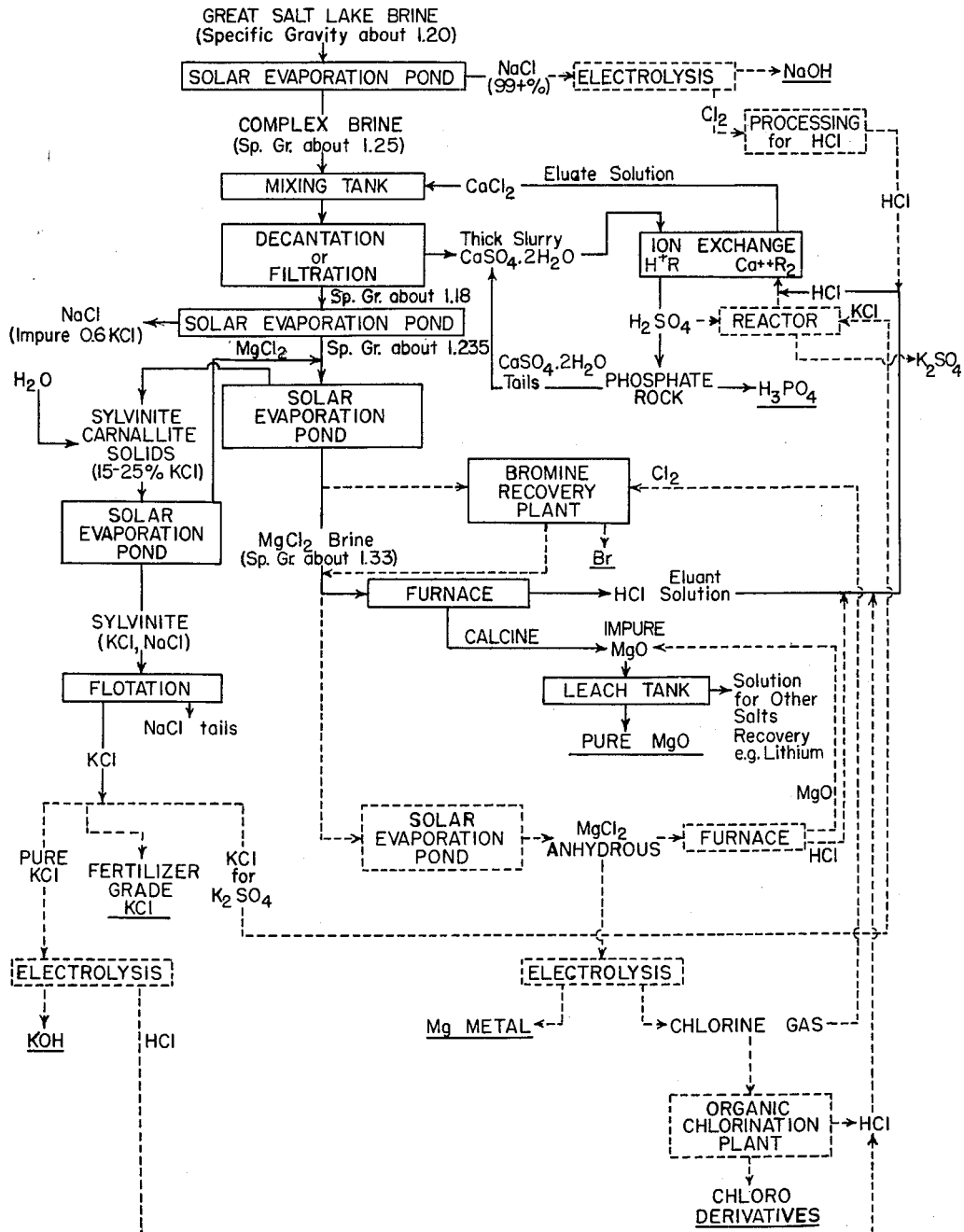
INVENTOR.
PABLO HADZERIGA
BY *Mallinckrodt and Mallinckrodt*
ATTORNEYS

United States Patent Office 3,099,528
Patented July 30, 1963

---

3,099,528
RECOVERY OF VALUES FROM NATURAL LAKE AND SEA BRINES
Pablo Hadzeriga, Salt Lake City, Utah, assignor, by mesne assignments, to Standard Magnesium Corporation, Inc., Tulsa, Okla., a corporation of New York
Filed Jan. 10, 1962, Ser. No. 165,393
6 Claims. (Cl. 23—89)

This invention relates to processes for the recovery of magnesium and potassium salts and other values from natural lake and sea brines.

The waters of various inland lakes such as the Great Salt Lake in the State of Utah are brines rich in magnesium chloride and containing an economically significant amount of potassium chloride as part of a complex salt content of 25.75% by weight. Sodium chloride is the largest single salt constituent, and, for many years, has been the only commercially recovered salt due to the fact that, after precipitation of a pure sodium chloride, solar evaporation of the remaining complex brine lays down a mixture of salts almost as complex as the brine itself. Yet, the presence of from about 100–130 million tons of $K_2O$ equivalent and of from about 140–180 million tons of magnesium metal equivalent has been so attractive that many attempts have been made to develop an economically successful extraction process.

While the composition of Great Salt Lake brines vary somewhat from season to season, an average analysis is as follows:

| | Percent |
|---|---|
| NaCl | 19.09 |
| KCl | 0.92 |
| $MgCl_2$ | 3.10 |
| $Na_2SO_4$ | 2.57 |
| $CaCO_3$ | 0.07 |
| Total Cl ion | 14.33 |
| Total $SO_4$ ion | 1.80 |
| Total solids | 25.75 |

The molar ratio of $MgCl_2$ to KCl is 2.64 and of $MgCl_2$ to $SO_4$ ion is 1.74. Because of this high ratio on the one hand and low ratio on the other, solar evaporation of the brines yields a complex mixture of different solid phases having a potassium content too low for economical recovery.

A major problem is the presence of an excessive quantity of sulfate. Elimination or at least a drastic reduction thereof is required. It has been proposed heretofore to accomplish this by precipitation with calcium chloride, and to then precipitate the magnesium from the residual complex brine with milk of lime. However, this requires excessive quantities of water for purposes of dilution and yields a calcium-contaminated magnesia. Moreover, recovery of KCl is low. The process has not proven practical.

The present invention is related to that set forth in my copending application for U.S. Patent Serial No. 63,075, filed October 17, 1960, entitled "Ion Exchange Process for Producing Potassium Sulfate," wherein it is shown how calcium chloride and sulfuric acid may be separately produced by an ion exchange procedure utilizing a slurry of calcium sulfate, e.g. gypsum, as the influent and hydrochloric acid as the eluant.

In carrying out the invention, the like brine is first subjected to solar evaporation to eliminate most of the sodium chloride in accordance with conventional practice. The resulting complex brine is then treated with a calcium chloride solution, obtained as a by-product of the above ion-exchange procedure, to precipitate calcium sulfate in the form of gypsum. This gypsum is, in turn, used as the feed for the ion-exchange procedure, which means that sulfate removal is economically accomplished along with the production of useful sulfuric acid. In addition, by appropriately treating the resulting sulfate-free brine to produce such useful products as potassium chloride, magnesium oxide, magnesium metal, etc., hydrochloric acid is obtained as a by-product and is effectively utilized as the eluant in the aforesaid ion-exchange procedure.

Thus, it is seen that the invention provides, for the first time, a practical and economically feasible process for extracting potassium and magnesium values from Great Salt Lake and similar brines.

The process is also applicable in like manner to sea water bittern, which is a complex reject brine resulting from the production of salt by solar evaporation of sea water, and to other essentially similar brines.

Treatment of the sulfate-free brine to obtain sylvinite and carnallite solids and MgO, with HCl as a useable by-product, is easily accomplished by solar evaporation to precipitate the sylvinite and carnallite solids, followed by heat decomposition of the residual $MgCl_2$ brine to yield an MgO calcine and a 14–16% HCl solution useable as the eluant in the aforesaid ion-exchange stage of the process. While this is the preferred way of treating the sulfate-free brine to obtain valuable products and a useable HCl solution, various other ways are possible as will be indicated hereinafter.

By permitting some of the $MgCl_2$ brine to go to waste in the process, a completely balanced cycle is obtained. However, if the sulfuric acid is utilized to react phosphate rock, not only is a valuable phosphoric acid product obtained, but a gypsum tailing results which may be used to supplement the influent to the ion-exchange procedure so that practically all the $MgCl_2$ brine can be effectively utilized.

In the making of the invention, the principal object was to provide a practical and economically feasible process for recovering substantially all the values present in natural lake and sea brines. A principal feature of the process is its cyclic nature, with essentially all of the needed materials being derived from the original brine.

The flow sheet of the accompanying drawing represents, in full lines, what is presently regarded as the best mode of carrying out the generic concepts in actual practice and, in dotted lines, certain alternatives. From the detailed description thereof other more specific objects and features of the invention will become apparent.

Referring to the drawing:

In the preferred practice of the invention as applied to lake waters of the type concerned, brine is taken directly from the lake and subjected to solar evaporation in ponds constructed for the purpose, yielding plus 99% pure sodium chloride as a useful product and a complex brine for further processing.

This is as far as it is customary to go in the industrial utilization of the waters of the lake, the complex brine being normally rejected and returned to the lake. However, in accordance with the present invention, the complex brine, which has a specific gravity of about 1.25 as compared to about 1.20 for the original lake brine, is processed to yield valuable products and useable HCl as a by-product. Processing of such brine to yield a sylvinite and carnallite salt product, which is high in KCl, and a magnesium oxide product is the preferred procedure.

To this end and as illustrated by full lines in the flow sheet, the complex brine is passed to a mixing tank where it is mixed with a quantity of calcium chloride solution calculated to precipitate about 95% of the total sulfate present, it being desirable and a feature of the invention to leave a small amount of the sulfate to aid in the precipitation of calcium during subsequent stages of evaporation, whereby calcium is effectively eliminated from a practical standpoint.

The resulting brine slurry of gypsum is passed to suitable thickening and settling apparatus, which may very well be a settling pond, as indicated, from which the supernatant brine of about 1.18 specific gravity is discharged to another solar evaporation pond and the heavy gypsum slurry is pumped to an ion-exchange system utilizing a cationic exchange resin in its hydrogen form, as more fully set forth in my aforesaid copending application for patent Serial No. 63,075.

In the ion-exchange system, calcium ions of the influent gypsum slurry are exchanged for hydrogen ions of the exchange resin, yielding sulfuric acid as the effluent. Upon eluting the calcium-loaded resin with hydrochloric acid eluant, which is derived at a later stage of the process an eluate solution of calcium chloride is obtained for use in precipitating additional calcium sulfate, as gypsum, from the complex brine.

As is detailed in my aforesaid copending application Serial No. 63,075, the exchange must be carried out at elevated temperature. No significant results are achieved at room temperature (20° C.). At about 50° C., a reasonably fast exchange takes place with a reasonably good yield, but a temperature of from 60° to 65° C. is preferable for most commercial applications. Generally speaking, the higher the temperature the greater the yield. Thus, I have found that, at 65° C., approximately 55% of the theoretical capacity of the resin is utilized, while, at 80° C., approximately 80% is utilized. At 60° C. and above the conversion from gypsum to sulfuric acid is practically instantaneous.

The supernatant complex brine from the gypsum-settling tank is relieved of remaining sodium chloride in the solar evaporation pond, the resulting complex brine of about 1.235 specific gravity being passed to another solar evaporation pond for the precipitation of sylvinite and carnallite solids, leaving a magnesium chloride brine of about 1.33 specific gravity.

The sylvinite and carnallite solids are desirably utilized to produce potassium chloride of high purity by proceeding with the aqueous dissolution of such solids followed by solar evaporation to produce sylvinite and a magnesium chlorine brine, which latter is re-cycled to the sylvinite and carnallite evaporation pond. The sylvinite, a mixture of potassium and sodium chlorides, is then subjected to flotation in known manner for the separation of these chlorides.

The magnesium chloride brine from the sylvinite and carnallite evaporation pond, whose specific gravity as previously mentioned is about 1.33, is passed to a suitable furnace, as by spraying into a preheated reaction chamber in well-known manner, to produce an impure magnesium oxide calcine and a 14–16% hydrochloric acid solution useful as the eluant for the ion-exchange procedure previously described.

While the impure MgO may be regarded as an end product of the process and sold as such for use or further processing by the purchaser, it is preferred to produce a pure MgO by leaching the calcine with water and drying the resulting purified MgO. The resulting leach solution is a chloride brine containing enough lithium to make it worthwhile, ordinarily, to send it to further processing in known manner for recovery of such lithium.

Sea water may be processed in essentially the same manner, although, due to its considerably greatest content of magnesium chloride, the same degree of balance in the processing system cannot be achieved. However, the excess magnesium chloride brine may be found useful for producing more hydrochloric acid as a commercial product and, coincidentally, more magnesium oxide than would otherwise be produced.

Typical assays of reject brines resulting from the manufacture of pure NaCl from sea water and from water of the Great Salt Lake, respectively, are shown by the following table:

|  | Sea Water, percent | Great Salt Lake, percent |
|---|---|---|
| NaCl | 6.6 | 13.1 |
| Na$_2$SO$_4$ | 7.2 | 6.5 |
| KCl | 1.9 | 2.1 |
| MgCl$_2$ | 13.6 | 7.0 |

The sulfuric acid derived as the effluent from the ion-exchange apparatus, which may be any of the known types, is about a 10% solution and requires concentration before it can be used in the treatment of phosphate rock. This is accomplished in well known manner, as is the treatment of phosphate rock, which yields orthophosphoric acid (H$_3$PO$_4$) as a commercial product and calcium sulfate or gypsum slurry useful as a supplement to the feed for the ion-exchange phase of the procedure. In this manner, most of the magnesium chloride brine can be utilized in what amounts to a substantially balanced processing system.

There are numerous ways of treating various ones of the several materials derived from the feed brine to yield the hydrochloric acid required as the eluant for the ion-exchange resin. Many of these will be obvious to persons skilled in the art after considering the several alternative procedures indicated by the dotted portions of the flow sheet. The selection of one or more particular procedures in any given instance will depend largely upon the final product or products desired.

Thus, if magnesium metal is desired, the MgCl$_2$ brine is evaporated to produce anhydrous MgCl$_2$, which is subjected to electrolysis in well known manner yielding magnesium metal, chlorine gas being produced as a by-product. Such gas is then utilized in known manner to chlorinate a hydrocarbon, such as benzene, acetylene, pentene, etc., in order to produce valuable intermediate organic products, such as chlorobenzene, trichloroethylene, monochloropentene, etc., hydrochloric acid being produced as a by-product.

Again, pure KCl derived from the sylvinite and carnallite solids can be subjected to electrolysis to produce KOH and hydrochloric acid, or not so pure a grade of KCl can be reacted with the sulfuric acid eluate from the ion-exchange step to produce K$_2$SO$_4$ and hydrochloric acid. Also, the pure NaCl from the first evaporation stage of the process can be subjected to electrolysis to yield NaOH and Cl$_2$, the latter being treated in well known manner to produce hydrochloric acid.

Whereas there is here illustrated and described a certain preferred procedure which is presently regarded as the best mode of carrying out the invention, it should be understood that various changes may be made without departing from the inventive concepts particularly pointed out and claimed herebelow.

I claim:
1. A process for recovering values from a brine of the type of natural lake or sea brines, comprising
   subjecting a brine of the type concerned to evaporation to yield sodium chloride in substantially pure form and a complex brine;
   precipitating calcium sulfate as a slurry from the complex brine by treatment with calcium chloride;
   subjecting the residual complex brine to evaporation to precipitate salts and yield an essentially magnesium chloride brine;
   contacting a cationic exchange material in its hydrogen form with the precipitated calcium sulfate slurry at a temperature of at least about 50° C., to yield sulfuric acid;
   deriving an aqueous solution of hydrochloric acid from at least one of the chloride salts previously obtained;
   eluting said exchange material with the hydrochloric acid solution to yield a calcium chloride eluate solution;

utilizing the eluate solution to precipitate calcium sulfate from an additional quantity of the complex brine resulting from the first step of the process;

and repeating the processing cycle indefinitely.

2. The process of claim 1, wherein the residual brine resulting from treatment of the complex brine with calcium chloride is subjected to a first evaporation step to remove any unprecipitated sodium chloride, followed by a second evaporation step to precipitate essentially sylvinite and carnallite solids.

3. The process of claim 1, wherein less than the stoichiometric amount of calcium chloride is used for precipitation of calcium sulfate from the complex brine so that a small amount of the sulfate is left in the residual brine to aid in the precipitation of calcium during subsequent stages of evaporation.

4. The process of claim 1, wherein the brine subjected to treatment is a reject brine resulting from the production of sodium chloride from a natural lake or sea brine, and the initial evaporation step is eliminated.

5. A process for recovering values from a brine of the type of natural lake or sea brines, comprising subjecting a brine of the type concerned to evaporation to yield sodium chloride in substantially pure form and a complex brine;

precipitating calcium sulfate as a slurry from the complex brine by treatment with calcium chloride;

subjecting the residual complex brine to evaporation to precipitate salts and yield an essentially magnesium chloride brine;

contacting a cationic exchange material in its hydrogen form with the precipitated calcium sulfate slurry at a temperature of at least about 50 °C., to yield sulfuric acid;

decomposing the magnesium chloride brine by the application of heat to yield magnesium oxide and an aqueous solution of hydrochloric acid;

eluting said exchange material with the hydrochloric acid solution to yield a calcium chloride eluate solution;

utilizing the eluate solution to precipitate calcium sulfate from an additional quantity of the complex brine resulting from the first step of the process;

and repeating the processing cycle indefinitely.

6. The process of claim 5, wherein the brine subjected to treatment is a reject brine resulting from the production of sodium chloride from a natural lake or sea brine, and the initial evaporation step is eliminated.

References Cited in the file of this patent

UNITED STATES PATENTS

| | | |
|---|---|---|
| 2,063,029 | Coleman et al. | Dec. 8, 1936 |
| 2,334,904 | Cheetham | Nov. 23, 1943 |
| 2,748,057 | Goren | May 29, 1956 |
| 2,759,794 | Fuchsman | Aug. 21, 1956 |

FOREIGN PATENTS

| | | |
|---|---|---|
| 547,019 | Great Britain | Aug. 10, 1942 |

OTHER REFERENCES

Mellor: Comprehensive Treatise on Inorganic and Theoretical Chemistry, volume 2, pages 525–6 (1922). Longmans, Green and Company, New York.